(12) United States Patent
Oh et al.

(10) Patent No.: US 8,199,453 B2
(45) Date of Patent: Jun. 12, 2012

(54) SHAFT CURRENT CONTROL BRUSH RING ASSEMBLY

(75) Inventors: Hieyoung W. Oh, Bowdoin, ME (US); Adam H. Willwerth, North Yarmouth, ME (US)

(73) Assignee: Illinois Tool Works Inc., Glenview, IL (US)

( * ) Notice: Subject to any disclaimer, the term of this patent is extended or adjusted under 35 U.S.C. 154(b) by 839 days.

(21) Appl. No.: 11/221,557

(22) Filed: Sep. 8, 2005

(65) Prior Publication Data
US 2006/0007609 A1    Jan. 12, 2006

Related U.S. Application Data

(63) Continuation-in-part of application No. 10/877,112, filed on Jun. 25, 2004, now Pat. No. 7,193,836, which is a continuation-in-part of application No. 10/714,295, filed on Nov. 14, 2003, now Pat. No. 7,136,271.

(60) Provisional application No. 60/673,308, filed on Apr. 20, 2005, provisional application No. 60/508,949, filed on Oct. 6, 2003, provisional application No. 60/508,950, filed on Oct. 6, 2003, provisional application No. 60/455,301, filed on Mar. 17, 2003.

(51) Int. Cl.
| | |
|---|---|
| *H05F 3/00* | (2006.01) |
| *H02H 1/00* | (2006.01) |
| *H02H 1/04* | (2006.01) |
| *H02H 3/22* | (2006.01) |
| *H05F 3/02* | (2006.01) |

(52) U.S. Cl. .......... 361/221; 361/212; 361/220

(58) Field of Classification Search .......... 361/230–231, 361/220–221
See application file for complete search history.

(56) References Cited

U.S. PATENT DOCUMENTS

| | | |
|---|---|---|
| 3,873,835 A | 3/1975 | Ignatjev |
| 4,189,702 A | 2/1980 | Maloy |
| 4,197,970 A | 4/1980 | Plumadore |
| 4,281,328 A | 7/1981 | Shores |
| 4,307,432 A | 12/1981 | Nishikawa |
| 4,358,699 A | 11/1982 | Wilsdorf |
| 4,398,113 A | 8/1983 | Lewis et al. |
| 4,494,166 A | 1/1985 | Billings et al. |
| 4,515,417 A | 5/1985 | Shiraishi |
| 4,535,264 A | 8/1985 | Allport |
| 4,801,270 A | 1/1989 | Scarlata |

(Continued)

FOREIGN PATENT DOCUMENTS
CN    1504012    6/2004
(Continued)

OTHER PUBLICATIONS

Arora et al., "JTAGG II Brush Seal Test Results," 33rd Joint Propulsion Conference and Exhibit, Jul. 6-9, 1997, pp. 1-15, NASA Technical Memorandum 107448, Seattle, WA.

(Continued)

*Primary Examiner* — Dharti Patel
(74) *Attorney, Agent, or Firm* — Fletcher Yoder P.C.

(57) ABSTRACT

A shaft current control brush ring assembly includes a cup and a brush ring assembly secured within the cup. The cup is secured to a motor faceplate, within a recess formed in the faceplate by interference fit, or by means of a clamp attached to the faceplate. A slinger can be associated with the brush ring assembly.

20 Claims, 2 Drawing Sheets

U.S. PATENT DOCUMENTS

| | | | |
|---|---|---|---|
| 4,994,861 A | | 2/1991 | Brandon et al. |
| 5,010,441 A | * | 4/1991 | Fox et al. ............... 361/221 |
| 5,085,373 A | | 2/1992 | Behr et al. |
| 5,090,710 A | | 2/1992 | Flower |
| 5,139,862 A | | 8/1992 | Swift et al. |
| 5,227,950 A | | 7/1993 | Twerdochlib |
| 5,251,081 A | | 10/1993 | Cossette et al. |
| 5,270,106 A | | 12/1993 | Orlowski et al. |
| 5,354,607 A | | 10/1994 | Swift et al. |
| 5,400,208 A | | 3/1995 | Pazda et al. |
| 5,474,305 A | * | 12/1995 | Flower ............... 277/355 |
| 5,661,356 A | | 8/1997 | Fisher et al. |
| 5,690,014 A | | 11/1997 | Larkin |
| 5,799,952 A | * | 9/1998 | Morrison et al. ............ 277/355 |
| 5,804,903 A | | 9/1998 | Fisher et al. |
| 5,812,908 A | | 9/1998 | Larocca et al. |
| 5,865,979 A | | 2/1999 | Collins et al. |
| 5,988,996 A | | 11/1999 | Brookbank et al. |
| 6,048,119 A | | 4/2000 | Kato et al. |
| 6,071,125 A | | 6/2000 | Shiozawa |
| 6,071,400 A | | 6/2000 | Schroder et al. |
| 6,277,336 B1 | | 8/2001 | Henrich et al. |
| 6,315,475 B1 | | 11/2001 | Carter et al. |
| 6,352,263 B1 | | 3/2002 | Gail et al. |
| 6,498,913 B1 | | 12/2002 | Tooker et al. |
| 6,517,357 B1 | | 2/2003 | Athanasiou et al. |
| 6,561,813 B2 | | 5/2003 | Rutten et al. |
| 6,686,673 B1 | | 2/2004 | Komura et al. |
| 6,896,735 B2 | | 5/2005 | Giuliano et al. |
| 6,909,868 B2 | | 6/2005 | Yamada et al. |
| 6,910,857 B2 | * | 6/2005 | Addis ............... 415/174.2 |
| 7,136,271 B2 | | 11/2006 | Oh et al. |
| 7,193,836 B2 | | 3/2007 | Oh et al. |
| 7,521,827 B2 | | 4/2009 | Orlowski et al. |
| 2002/0121821 A1 | | 9/2002 | Ritter |
| 2003/0030340 A1 | | 2/2003 | Tashiro |
| 2003/0052564 A1 | | 3/2003 | Wilsdorf |
| 2003/0086630 A1 | | 5/2003 | Bramel et al. |
| 2004/0135016 A1 | | 7/2004 | Baumann et al. |
| 2004/0184215 A1 | * | 9/2004 | Oh et al. ............... 361/220 |
| 2004/0233592 A1 | | 11/2004 | Oh et al. |
| 2006/0007609 A1 | | 1/2006 | Oh et al. |
| 2007/0040459 A1 | | 2/2007 | Oh |
| 2007/0278093 A1 | | 12/2007 | Barnard et al. |
| 2008/0258576 A1 | | 10/2008 | Oh et al. |
| 2010/0252420 A1 | | 10/2010 | Barnard et al. |

FOREIGN PATENT DOCUMENTS

| | | |
|---|---|---|
| EP | 0796663 | 8/2001 |
| EP | 1460885 | 9/2004 |
| EP | 1523086 | 4/2005 |
| JP | 5752773 | 3/1982 |
| JP | 2168595 | 6/1990 |
| JP | 4368446 | 12/1992 |
| JP | 6036887 | 2/1994 |
| JP | 6199010 | 7/1994 |
| JP | 2004356099 | 12/2004 |
| JP | 2005151749 | 6/2005 |
| WO | 9701200 | 1/1997 |

OTHER PUBLICATIONS

Northrop Grumman Component Technologies, "Fiber Brush Slip Ring Technology for Mission-Critical Aerospace and Military Applications"; Poly-Scientific, Copyright 1998.

Furutani et al., "Accretion of titanium carbide by electrical discharge machining with powder suspended in working fluid," Precision Engineering Journal of the International Societies for Precision Engineering and Nanotechnology, 2001, pp. 138-144, Elsevier.

Schiferl et al., "Bearing Current Remediation Options," IEEE Industry Applications Magazine, Jul.-Aug. 2004, pp. 40-50.

Yung, "Wind Generators: Unique Repair Tips," EASA Convention, Jun. 26, 2006, pp. 1-27, Las Vegas, NV.

"Inverter-Driven Induction Motors Shaft and Bearing Current Solutions," Rockwell Automation Industry White Paper, Dodge Reliance Electric.

* cited by examiner

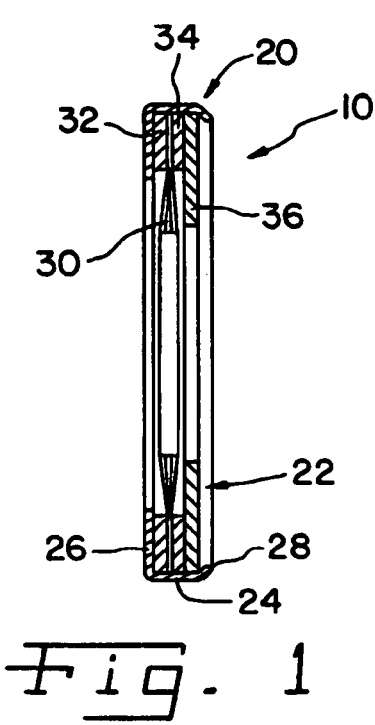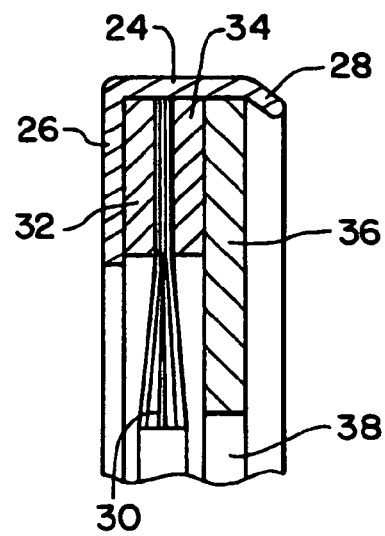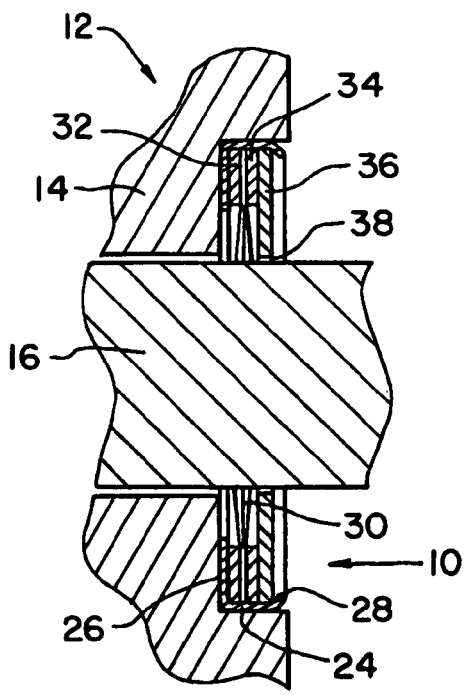

SHAFT CURRENT CONTROL BRUSH RING ASSEMBLY

CROSS-REFERENCE TO RELATED APPLICATIONS

The present application claims the benefit of U.S. Provisional Application Ser. No. 60/673,308 filed on Apr. 20, 2005, and is a continuation-in-part of U.S. patent application Ser. No. 10/877,112 filed on Jun. 25, 2004, now U.S. Pat. No. 7,193,836 which claims the benefits of U.S. Provisional Application Ser. No. 60/508,949, filed Oct. 6, 2003, and U.S. Provisional Application Ser. No. 60/508,950, also filed Oct. 6, 2003, and is a continuation-in-part of U.S. application Ser. No. 10/714,295, filed on Nov. 14, 2003, now U.S. Pat. No. 7,136,271 which claims the benefit of U.S. Provisional Application Ser. No. 60/455,301, filed on Mar. 17, 2003.

FIELD OF THE INVENTION

The present invention relates to grounding devices for controlling shaft current that is generated in AC variable speed motors or DC motors, generators, and other rotating shafts and, more specifically, to non-contacting grounding devices.

BACKGROUND OF THE INVENTION

Shaft induced electrical current is experienced in electrical motors, and is commonly experienced with three-phase motors driven by variable speed drives. Variable speed drives utilize pulse width modulation technology to vary the speed of AC motors, thereby allowing use of less-expensive AC motors in applications where more expensive DC motors had been used previously. A drawback to the use of AC motors with variable speed drives is that higher common mode voltage (CMV) is generated by the variable speed drive that increases shaft induced currents.

Voltage on the motor shaft induces current flow through the shaft bearings to the motor frame and then to ground. While the motor is running, the bearings become more resistive to current flow, causing a buildup of charge on the shaft surfaces. Over a short period of time, the CMV causes electrical charges to build to a high level. As the electrical charges pass the threshold level of the least electrically resistant path, usually through the ball bearings on the shaft, an instantaneous burst or discharge of electrical energy passes through the bearing. This discharge causes electric discharge machining (EDM), which can damage the surfaces of the bearing races and the balls in the bearing. The electrical energy burst creates fusion craters, and particulate from the crater formation remains inside the sealed bearing. Both the fusion crater and the particulate material in the bearing act to disturb the free flow rotation of the bearing, which can lead to physical damage and premature bearing failure.

A number of mitigation technologies have been used in attempts to overcome this problem. Known attempts include using conductive bearing grease, insulating the bearings and using copper/phosphorus brushes and a Faraday shield. A common, somewhat cost-effective solution that has been used is to ground the shaft using spring-loaded copper brushes that provide a continuous flow of current to ground. Copper brushes, however, wear out quite rapidly and require frequent, periodic service and replacement. Additionally, oxide buildup on the shaft and other barriers between the brushes and the shaft reduce the current flow and cause a burst of electrical energy across the brush and shaft. Spring-loaded brushes also tend to vibrate due to alternating frictional stick/slip relationships between the brush and the shaft surface. Vibration of the brushes, from whatever cause, can result in undesirable sparking.

The aforementioned parent application Ser. No. 10/877,112 discloses a grounding brush for mitigating electrical current on motor shafts including conductive filaments in a holder surrounding the shaft. The brush can be used as a non-contacting ionizer to reduce the amount of electrical charges on the isolated shaft or on an isolated roller.

What is needed in the art is a grounding system that can be used effectively for a prolonged period of time, requiring minimal service or replacement, and that can be installed easily and quickly in the assembly of new motors and as a retrofit for existing motors.

SUMMARY OF THE INVENTION

The present invention provides a grounding brush assembly that can be press-fit into a modified end plate of a motor or can be clamped in place on the shaft of the motor for retrofit applications without modification to the motor end plate.

In one aspect thereof, the present invention provides a shaft current control brush ring assembly for a motor having a faceplate and a shaft. The assembly includes a cup having an outer band, an inner barrier and an outer lip. A brush assembly is disposed in the cup and held between the inner barrier and the lip. The brush assembly has an annular inner plate, an annular outer plate and a plurality of filaments secured between the inner plate and the outer plate. The filaments have distal ends extending radially inwardly beyond the inner and outer plates. The cup with the brush assembly therein is disposed around the shaft and secured to the faceplate.

In another aspect thereof, the present invention provides a shaft current control brush ring assembly with a cup having an outer band, an inner barrier and an outer lip. A brush assembly is disposed in the cup and held between the inner barrier and the lip. The brush assembly has an annular inner plate, an annular outer plate and a plurality of filaments secured between the inner plate and the outer plate. The filaments have distal ends extending radially inwardly beyond the inner and outer plates.

In still another aspect thereof, the present invention provides an electric motor with a motor faceplate, a motor shaft extending outwardly of the faceplate; and a shaft current control brush ring assembly disposed around the shaft and secured to the faceplate. The shaft current control brush ring assembly includes a cup having an outer band, an inner barrier and an outer lip. A brush assembly is disposed in the cup and held between the inner barrier and the lip. The brush assembly has an annular inner plate, an annular outer plate and a plurality of filaments secured between the inner plate and the outer plate. The filaments have distal ends extending radially inwardly beyond the inner and outer plates. The cup with the brush assembly therein is disposed around the motor shaft and the cup is secured to the motor faceplate.

An advantage of the present invention is providing an effective conductive brush assembly to reduce shaft current on electrical motors.

Another advantage of the present invention is providing a grounding device for electrical motor shafts that functions effectively for a prolonged period of time without service, maintenance or repair.

Still another advantage of the present invention is providing a conductive brush system having improved conductivity therethrough for improved grounding performance of the device through precise, optimal positioning of the components thereof.

A still further advantage of the present invention is providing a grounding device for electrical motors that is readily adapted to motors of different sizes.

Yet another advantage of the present invention is providing a shaft current control brush ring assembly that can be installed quickly and easily in new motors during manufacture or can be retrofit on existing motors without significant modification to the motor.

Other features and advantages of the invention will become apparent to those skilled in the art upon review of the following detailed description, claims and drawings in which like numerals are used to designate like features.

BRIEF DESCRIPTION OF THE DRAWINGS

FIG. 1 is a cross-sectional view of a shaft current control brush ring assembly in accordance with the present invention;

FIG. 2 is a cross-sectional view of a shaft current control brush ring assembly mounted in a machined bore in the faceplate of an electric motor;

FIG. 3 is an enlarged cross-sectional view of a portion of the shaft current control brush ring assembly shown in FIG. 1;

Figure 4:
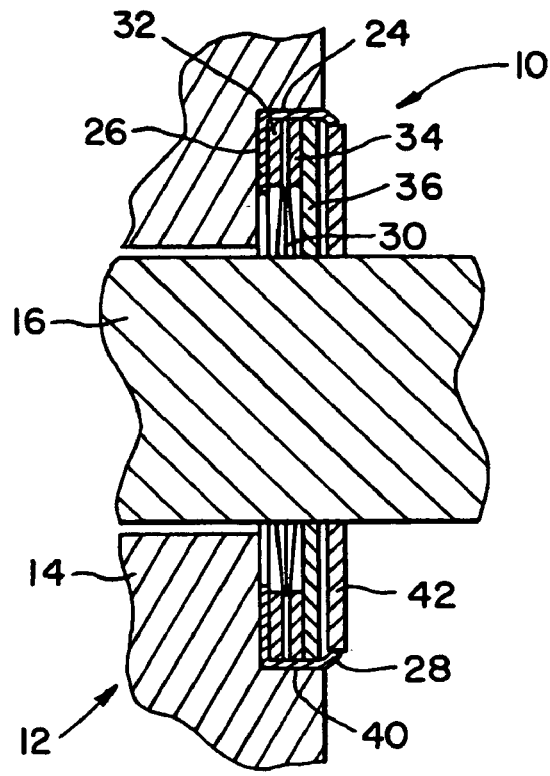
FIG. 4 is a cross-sectional view of a shaft current control brush ring assembly in accordance with the present invention for use with a motor having an annular slinger.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, numeral 10 designates a shaft current control brush ring assembly in accordance with the present invention. Brush ring assembly 10 is installed on a motor 12 (FIG. 2) and specifically in a faceplate 14 of motor 12 for dissipating electrical charges that may build up on a shaft 16 of motor 12. It should be understood that brush ring assembly 10 can be provided in a variety of different sizes for use in motors of different types and on shafts 16 of different diameters.

Brush ring assembly 10 is of generally annular shape, surrounding shaft 16. Brush ring assembly 10 is secured to faceplate 14 and is operatively arranged between shaft 16 and faceplate 14. Brush ring assembly 10 is continuously operative to dissipate electrical charges that build on motor shaft 16 during operation of motor 12 by transferring the charges from shaft 16 to faceplate 14 and the grounding circuit of motor 12.

Brush ring assembly 10 includes an annular cup 20 and a brush assembly 22 disposed therein. Cup 20 includes an outer band 24, an inner barrier 26 and an outer lip 28. Together, outer band 24, inner lip 26 and outer lip 28 form an annular shell or channel-like cup 20 in which brush assembly 22 is disposed. Cup 20 is made of conductive materials and has mechanical properties necessary for mounting the assembly to faceplate 14 as will be described hereinafter. Accordingly, cup 20 can be made of aluminum, stainless steel, bronze, copper or other suitable material.

Brush assembly 22 includes a plurality of individual fiber filaments 30 that may be arranged individually, in a substantially continuous annular ring or in bundles circumferentially around shaft 16. Each filament 30 is a fine, hair-like structure and is made from carbon fibers, stainless steel, conductive plastics such as acrylic or nylon fibers, or any other conductive fiber-type filament that can be provided with diameters sufficiently small to induce ionization when in the presence of an electrical field. Filaments 30 generally have diameters less than about 150 microns. Preferably, filaments 30 have diameters within a range of about 5 microns to about 100 microns.

With reference to the enlarged, fragmentary view of FIG. 3, filaments 30, or bundles thereof, are held between an annular inner plate 32 and an annular outer plate 34. Distal end portions of filaments 30 extend past the inner diameters of annular inner plate 32 and annular outer plate 34. Filaments 30 or bundles thereof can be secured to inner plate 32 and outer plate 34 by conductive adhesive, adhesive tape or other suitable means (not shown). Alternatively, filaments 30 can be placed directly against the confronting surfaces of inner plate 32 and outer plate 34 and held therein in a press-fit arrangement in cup 20, with lip 28 hold brush assembly 22 against inner barrier 26.

Inner plate 32 and outer plate 34 are made of conductive materials for the transfer of electrical charge from filaments 30 to cup 20, and can be made of aluminum, stainless steel, bronze, copper or other suitable material. An annular shield 36 is provided on the outer side of outer plate 34 and has a central opening of smaller diameter than inner plate 32 and outer plate 34, and only slightly larger than the diameter of shaft 16. Accordingly, shield 36 covers and protects filaments 30 but is in spaced relation thereto, being separated and spaced from filaments 30 by the thickness of outer plate 34. Shield 36 is spaced minimally from shaft 16 so that only a small gap 38 remains between shield 36 and shaft 16, to inhibit ingress of contaminants to brush assembly 22.

FIG. 2 illustrates the manner in which brush ring assembly 10 is installed in faceplate 14. Specifically, faceplate 14 includes a precisely machined recess 40 therein of appropriate diameter to receive cup 20 in a press-fit arrangement. Brush assembly 22 is installed in cup 20, with lip 28 folded inwardly to compress the assembly of brush assembly 22 within cup 20. The completed assembly of brush ring assembly 10 is pressed into recess 40 and held therein by an interference fit relationship. Lip 28 is angularly oriented, and can be slightly outward of the outer surface of faceplate 14 as well as outer plate 34, to direct contaminants away from brush assembly 22. Any fluids or debris cascading down faceplate 14 are diverted outwardly by lip 28. Precise machining of recess 40 facilitates accurate, optimal positioning of filaments 30 relative to shaft 16 for optimal performance of shaft current control brush ring assembly 10. Cup 20 can be tapered or chamfered at the junction of inner barrier 26 and outer barrier 24 to facilitate insertion of cup 20 into recess 40.

When installed, filaments 30 can be in direct contact with shaft 16 as a grounding brush, for direct transfer of electrical charge from shaft 16 to brush ring assembly 10. Alternatively, filaments 30 can be minimally spaced from shaft 16 such that, as an electrical field is generated by charges building on shaft 16, an ionized field is created, allowing indirect transfer of charges from shaft 16 to filaments 30. In still another suitable arrangement, the fine, lightweight filaments 30 are in contact with shaft 16 when motor 10 is at rest or is operating at slow speeds. As the speed of shaft 16 increases during startup and use, air currents move filaments 30 away from shaft 16. Eliminating or reducing the time period of frictional contact between filaments 30 and shaft 16 reduces wear and prolongs the life of filaments 30. Faceplate 14 is electrically connected to ground, and charges building on shaft 16 are dissipated to ground through brush ring assembly 10 before arcing can occur.

FIG. 4 illustrates a further embodiment of the present invention in which a slinger 42 is provided at the outer lip of cup 20. Slinger 42 is of conventional design, well known to those skilled in the art. Slinger 42 is mounted on shaft 16 for rotation therewith. Debris or fluids contacting sling 42 are propelled outwardly and away from brush assembly 22 by the centrifugal action of the rotating slinger. Any fluids or debris cascading down faceplate 14 are diverted by lip 28 to the outer surface of slinger 42, to be driven away as described above.

Figure 5:
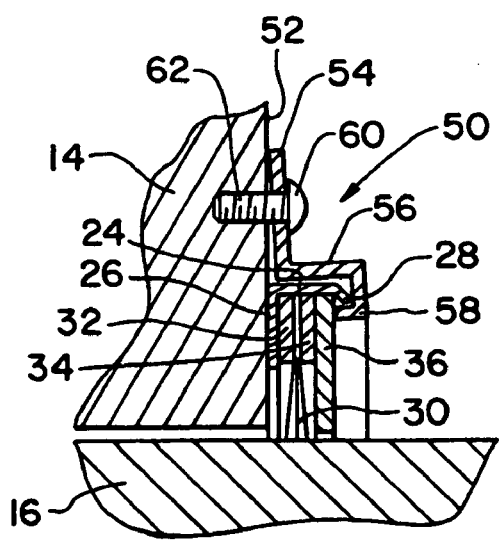
FIG. 5 is a fragmentary cross-sectional view of a shaft current control brush ring assembly in accordance with the present invention illustrating an attachment system utilizing a clamp to retrofit the ring assembly on a motor.

FIG. 5 illustrates yet another embodiment of the present invention in which a plurality of clamps 50 hold shaft current control brush ring assembly 10 in operating position on faceplate 14. While only one clamp 50 is shown, it should be understood that several clamps 50 positioned around assembly 10 can be used. Shaft current control brush ring assembly 10 is placed against an outer surface 52 of faceplate 14 for installation. Clamps 50 include a base 54 against outer surface 52 and a riser 56 substantially perpendicular to base 54 and extending along side outer band 24. An annular hooked end 58 overlaps and engages outer lip 28. Hooked end 58 is engaged against shield 36 and lip 28 to hold brush ring assembly 10 firmly against faceplate 14. Fasteners 60 in the nature of screws or bolts are received in holes 62 provided in faceplate 14. Clamps 50 can be of a spring-like design to forcibly hold brush ring assembly 10 against faceplate 14. It should be understood that while a plurality of clamps 50 can be used, a clamping ring of annular design also can be used. In an annular design the individual components need not be annular to extend completely around brush ring assembly 10 uninterrupted. One or more of base 54, riser 56 and hooked end 58 can be provided as multiple segments or continuously annular. For example, a plurality of individual riser segments can be used between an annular base 54 and an annular hooked end 58, or with a segmented base or a segmented hooked end. An annular riser 56 can be used with a segmented base and/or a segmented hooked end.

Using clamps 50, or one of the variations thereof as described above, ring assembly 10 can be retrofit on a motor quickly and easily without modification of the motor except for drilling appropriate holes 62 for receiving fasteners 60. Retrofit is easy and quick.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A shaft current control brush ring assembly for a motor having a faceplate and a shaft, said assembly comprising:
a cup having an outer band, an inner barrier and an outer lip, wherein the inner barrier and the outer lip are positioned on opposite axial sides of the outer band;
a brush assembly disposed in said cup and held in axial compression between said inner barrier and said outer lip, said brush assembly having an electrically conductive annular inner plate, an electrically conductive annular outer plate and a plurality of electrically conductive filaments secured between said electrically conductive annular inner plate and said electrically conductive annular outer plate, said electrically conductive filaments having distal ends extending radially inwardly beyond said electrically conductive annular inner and annular outer plates; and
said cup with said brush assembly therein being adapted to be disposed around the shaft and secured to the faceplate, such that electrical charge from the shaft is transferred to the cup via an electrical path formed by the electrically conductive filaments and the electrically conductive annular inner and annular outer plates.

2. The shaft current control brush ring assembly of claim 1, said cup being secured in a recess in the faceplate via an interference fit.

3. The shaft current control brush ring assembly of claim 1, said cup being secured against a surface of said faceplate.

4. The shaft current control brush ring assembly of claim 1, including a clamp secured to the faceplate and holding said cup against an outer surface of the faceplate.

5. The shaft current control brush ring assembly of claim 4, said clamp including a fastener engaged in a hole in said faceplate.

6. The shaft current control brush ring assembly of claim 5, said clamp having a base against the outer surface of the faceplate, a riser projecting outwardly from said base along said band and a hooked end engaged against said outer lip.

7. The shaft current control brush ring assembly of claim 1, wherein each of the plurality of electrically conductive filaments comprises a diameter of less than approximately 150 microns.

8. The shaft current control brush ring assembly of claim 1, wherein the electrically conductive annular inner and annular outer plates are each made of a material comprising at least one of aluminum, stainless steel, bronze, or copper.

9. A shaft current control brush ring assembly for a motor having a faceplate and a motor shaft, the assembly comprising:
a cup having an outer band, an inner barrier and an outer lip, wherein the inner barrier and the outer lip are positioned on opposite axial sides of the outer band; and
a brush assembly disposed in said cup and held in axial compression between said inner barrier and said outer lip, said brush assembly having a plurality of electrically conductive filaments configured to be arranged circumferentially around the motor shaft, and wherein the brush assembly is configured to transfer electrical charge from the motor shaft to the cup at least through the plurality of electrically conductive filaments.

10. The shaft current control brush ring assembly of claim 9, wherein the brush assembly comprises:
an electrically conductive annular inner plate; and
an electrically conductive annular outer plate;
wherein the plurality of electrically conductive filaments is secured between the electrically conductive annular inner and annular outer plates, and wherein the electrically conductive filaments and the electrically conductive annular inner and annular outer plates collectively provide an electrical path for the transfer of the electrical charge from the motor shaft to the cup.

11. The shaft current control brush ring assembly of claim 10, said brush assembly having a shield disposed against said electrically conductive annular outer plate and held thereagainst by said outer lip.

12. The shaft current control brush ring assembly of claim 11, including a slinger disposed outwardly of said shield.

13. The shaft control current brush ring assembly of claim 9, wherein the outer lip is oriented outwardly with respect to the faceplate and in an angled radial direction towards an axis of rotation of the motor shaft.

14. The shaft current control brush ring assembly of claim 9, wherein the plurality of electrically conductive filaments is configured to transfer electrical charge from the motor shaft to the cup via direct contact with the motor shaft.

15. The shaft current control brush ring assembly of claim 9, wherein the plurality of electrically conductive filaments is configured to be spaced from the motor shaft by a gap, and wherein the electrical charge is transferred indirectly from the motor shaft to the cup via an electrical field across the gap.

16. An electric motor comprising:
   a faceplate;
   a motor shaft extending outwardly of said faceplate;
   a grounding circuit;
   a shaft current control brush ring assembly disposed around said motor shaft and secured to said faceplate, said shaft current control brush ring assembly including:
      a cup having an outer band, an inner barrier and an outer lip, wherein the inner barrier and the outer lip are positioned on opposite axial sides of the outer band; and
      a brush assembly disposed in said cup and held in axial compression between said inner barrier and said outer lip, said brush assembly having an annular inner plate, an annular outer plate and a plurality of filaments secured between said annular inner plate and said annular outer plate, said filaments having distal ends extending radially inwardly beyond said annular inner and annular outer plates; and
      said cup with said brush assembly therein being disposed around said motor shaft and said cup being secured to said motor faceplate;
   wherein the electric motor is configured to transfer an electrical charge present on the motor shaft from the motor shaft to the grounding circuit through the plurality of filaments, the annular inner and outer plates, and the cup.

17. The motor of claim 16, including a recess defined in said faceplate, and said cup being secured in said recess by an interference fit.

18. The motor of claim 16, including a clamp secured to the faceplate and said clamp holding said cup against an outer surface of said faceplate.

19. The motor of claim 18, said clamp having a base against said outer surface of said faceplate, a riser projecting outwardly from said base along said outer band of said cup, and a hooked end of said clamp engaged against said outer lip.

20. The motor of claim 16, said brush assembly having a shield disposed against said annular outer plate and held thereagainst by said outer lip, said shield extending radially inwardly beyond said annular outer plate.

* * * * *